United States Patent [19]

Suzuki

[11] Patent Number: 5,555,380
[45] Date of Patent: Sep. 10, 1996

[54] DATA TRANSFER SYSTEM WITH BUFFER REQUEST INCLUDING BLOCK LENGTH TO UPDATE THE BUFFER POINTER PRIOR TO TRANSFERRING OF THE BLOCK

[75] Inventor: Hideto Suzuki, Tokyo, Japan

[73] Assignee: NEC Corporation, Tokyo, Japan

[21] Appl. No.: 867,523

[22] Filed: Apr. 13, 1992

[30] Foreign Application Priority Data

Apr. 11, 1991 [JP] Japan ........................... 3-106805

[51] Int. Cl.$^6$ ............................ G06F 15/16; G06F 12/02
[52] U.S. Cl. .................. 395/250; 395/876; 395/200.01;
364/DIG. 1; 364/239; 364/239.51; 364/239.8;
364/230; 364/939; 364/939.81; 364/230;
364/939; 364/939.81
[58] Field of Search ........................ 395/250, 876,
395/200.1, 872

[56] References Cited

U.S. PATENT DOCUMENTS

| | | | |
|---|---|---|---|
| 4,214,305 | 7/1980 | Tokita et al. ........................ | 395/200 |
| 4,272,819 | 6/1981 | Katsumata et al. .................. | 395/842 |
| 4,599,689 | 7/1986 | Berman ............................... | 395/250 |
| 4,663,706 | 5/1987 | Allen et al. ......................... | 395/200.13 |
| 4,914,652 | 4/1990 | Nguyen ............................... | 370/85.5 |
| 5,117,486 | 5/1992 | Clark et al. ......................... | 395/250 |
| 5,247,626 | 9/1993 | Firoozmand ........................ | 395/250 |
| 5,287,456 | 2/1994 | Rhodes et al. ...................... | 395/200.01 |

FOREIGN PATENT DOCUMENTS 0273083  7/1988  European Pat. Off. .

OTHER PUBLICATIONS

"Automatic Request Response Control Block DMA for High Performance IOP", IBM Technical Disclosure Bulletin, vol. 33, No. 5, Oct. 1990, pp. 401–404.
J. A. Appel et al., "A High Capacity FASTBUS Multiple Event Buffer", IEEE Transactions on Nuclear Science, vol. NS–32, No. 1, Feb. 1985, pp. 105–107.

*Primary Examiner*—Thomas C. Lee
*Assistant Examiner*—D. Dinh
*Attorney, Agent, or Firm*—Foley & Lardner

[57] ABSTRACT

A data transfer system includes a buffer having a plural buffer areas for storing the data blocks transferred from plural central processors, and an external pointer storing an address data corresponding to an initial position of one of the buffer areas where a transferring data block is to be stored therein. The address data stored in the external pointer is renewed in accordance with a length of a data block to be transferred.

15 Claims, 7 Drawing Sheets

TRANSFER BLOCK

DATA TRANSFER SYSTEM WITH BUFFER REQUEST INCLUDING BLOCK LENGTH TO UPDATE THE BUFFER POINTER PRIOR TO TRANSFERRING OF THE BLOCK

FIELD OF THE INVENTION

This invention relates to a data transfer system, and more particularly to, a data transfer system using an auto-increment-pointer.

BACKGROUND OF THE INVENTION

A conventional data transfer system, using auto-increment-pointer, includes a plurality of central processors, an I/O panel having a buffer, an internal pointer and an external pointer, and a system bus connected between the central processors and the I/O panel. The buffer includes a predetermined number of buffer areas accessed by the central processors and the I/O panel. The external pointer stores an initial address for access to the buffer areas by the central processors and the internal pointer stores an initial address for access to the buffer areas only by the I/O panel. The priority is decided among the central processors by a bus arbitration circuit.

In the conventional data transfer system, when the external pointer is read by one of the central processors which is selected by the bus arbitration circuit, address data stored in the external pointer is supplied to the central processor. Then, a predetermined data block is transferred from the central processor in a write mode to the buffer area designated by the address data of the external pointer. At this time, in the external pointer, an address value "1" is automatically added to the preceding address data, and the added address is stored in the external pointer as a subsequent address. In the same manner, a read mode is carried out between the central processors and the I/O panel.

On the other hand, when the internal pointer is accessed by the I/O panel, a predetermined data block is transferred from the buffer, for instance, to a periphery circuit in accordance with an address data stored in the internal pointer.

According to the conventional data transfer system, however, there are disadvantages in that when a transferred data block has a length longer than that of the buffer areas, the data block has to be divided so that the divided data is shorter than the length of the buffer areas, because the length of the buffer areas is fixed to be a predetermined length. As a result, a transfer speed is low. On the other hand, if a length of a transferred data block is shorter than that of the buffer area, a portion of the area is useless in the buffer.

SUMMARY OF THE INVENTION

Accordingly, it is an object of the invention to provide a data transfer system which operates with high speed.

It is another object of the invention to provide a data transfer system in which a buffer can be used efficiently.

It is a further object of the invention to provide a data transfer system in which a data block stored in the buffer can be read from its initial point at any time.

According to the invention, a data transfer system is provided, including:

at least two processors each having a predetermined data block to be transferred;

a buffer having a predetermined number of buffer areas for storing data blocks transferred from the at least two processors; and an external pointer storing an address data designating to an initial position of one of the buffer areas;

wherein the address data is increased or decreased by a value determined in accordance with a ratio between a length of the data block and a length of the buffer areas.

BRIEF DESCRIPTION OF THE DRAWINGS

The invention will be explained in more detail in conjunction with appended drawings; wherein.

DESCRIPTION OF THE PREFERRED EMBODIMENTS

Figure 1:
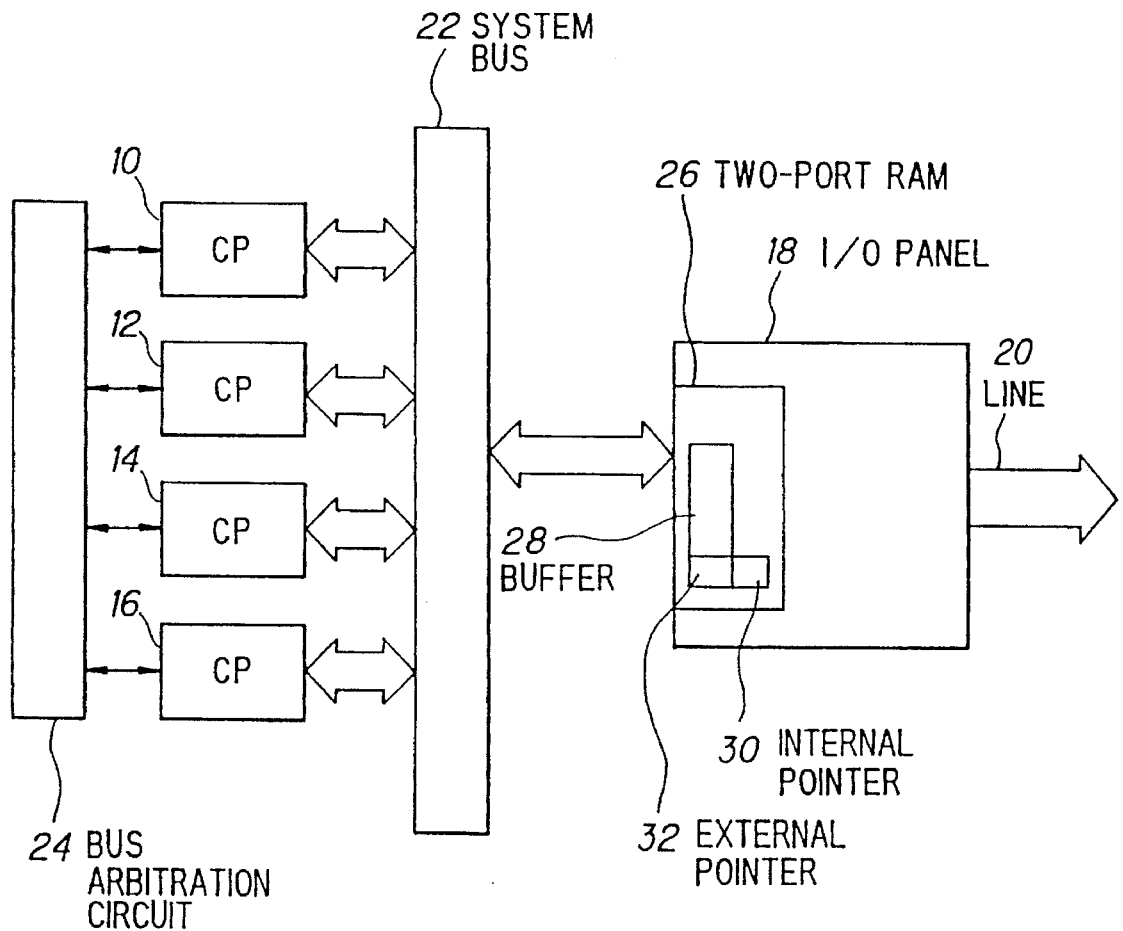
FIG. 1 is a block diagram showing a data transfer system of a preferred embodiment according to the invention.

FIG. 1 shows a data transfer system of a preferred embodiment according to the invention. The data transfer system includes four central processors 10, 12, 14 and 16, an I/O panel 18 connected to a line 20, a system bus 22 connected between each of the central processors 10, 12, 14 and 16 and the I/O panel 18, and a bus arbitration circuit 24 connected to the central processors 10, 12, 14 and 16, respectively.

Figure 2:
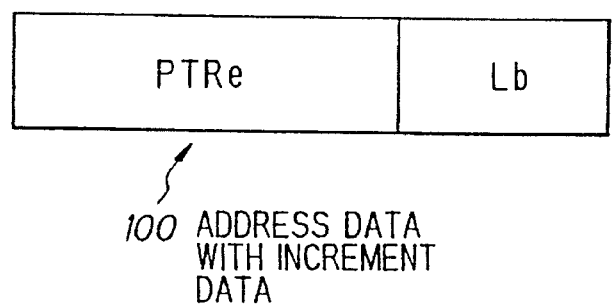
FIG. 2 is a format of data transferred from a central processor to an I/O panel in the preferred embodiment.
Figure 4:
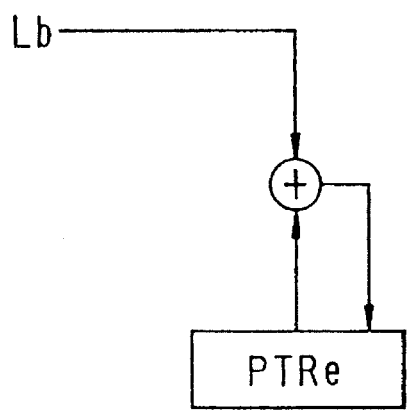
FIG. 4 is an explanatory view showing operation of the I/O panel (an external pointer) of the preferred embodiment.
Figure 3:
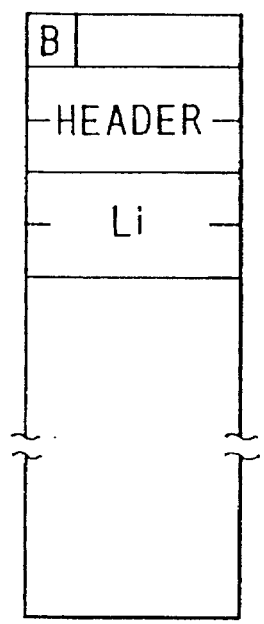
FIG. 3 is a format of a data block transferred from a central processor to a buffer in the preferred embodiment.

The bus arbitration circuit 24 controls the central processors 10, 12, 14 and 16 to access to the I/O panel 26 without a confliction among them. The I/O panel 18 includes a two-port RAM 26 having a buffer 28, and internal and external pointers 30 and 32 storing address data PTRi and PTRe for access to the buffer 28 by the central processors 10, 12, 14 and 16 and the I/O panel 18, respectively. Each of the central processors 10, 12, 14 and 16 supplies an increment data "Lb" corresponding to a length of a transferred data block to the external pointer 32 in addition to the address data PTRe, so that a data 100 is obtained as shown in FIG. 2. At the same time, each of the central processors 10, 12, 14 and 16 transfers a data block including a buffer busy flag "B", a header "HEADER" and a length data "Li" of the transferring data block to the buffer 28 as shown in FIG. 3. The header "HEADER" is determined to be a different value relative to the other data blocks to avoid a confusion among them. The address data PTRe is renewed by the addition of the increment data "Lb" thereto as shown in FIG. 4.

Figure 5:
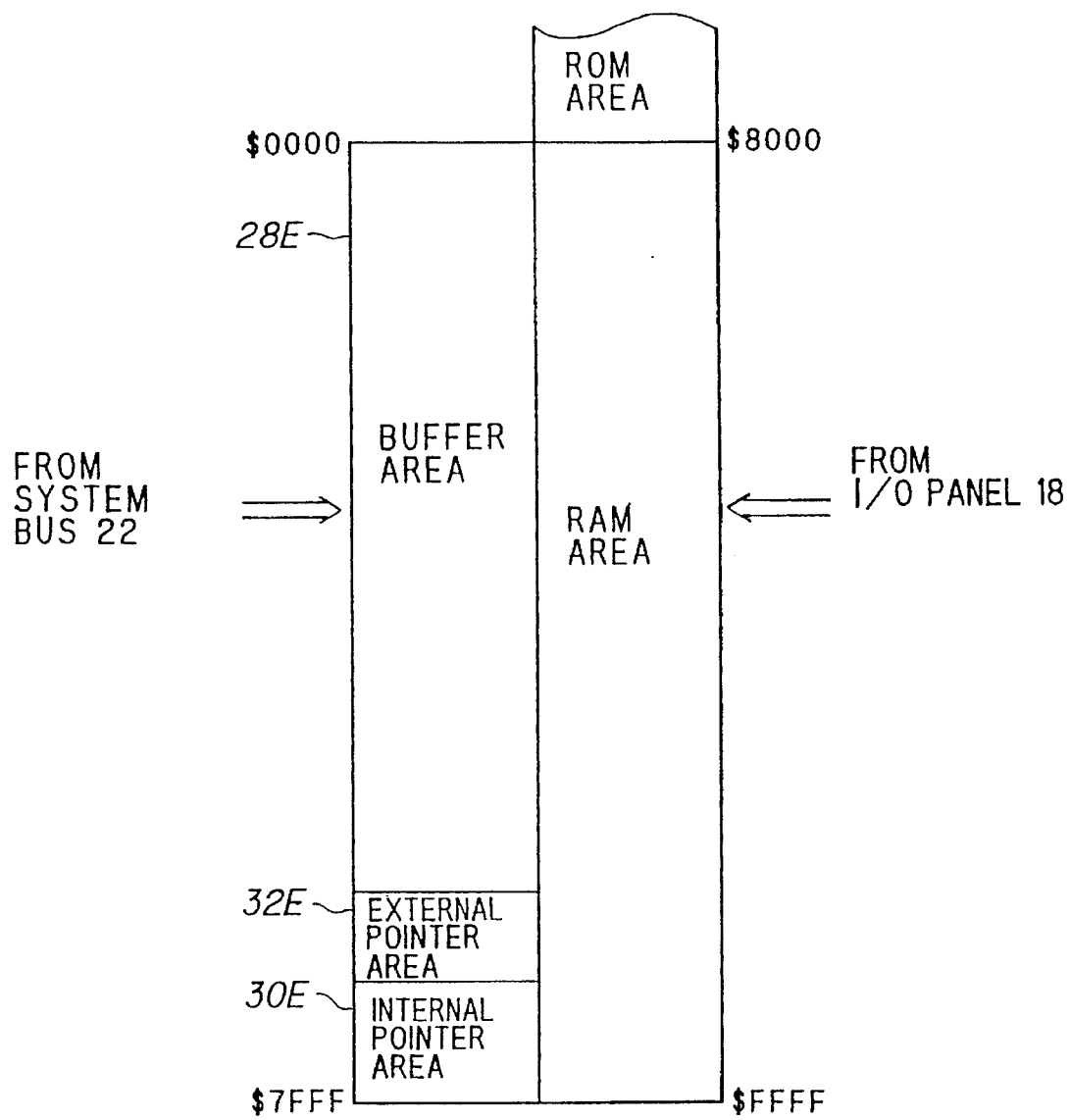
FIG. 5 is a memory map of a two-port RAM used in the preferred embodiment.

FIG. 5 shows a memory map of the two-port RAM 26 having two aspects for the I/O panel 18 and for the system bus 22. That is, for the I/O panel 18, the two-port RAM 26 has addresses $0000 to $7FFF to be composed of a RAM area having addresses $8000 to $FFFF. On the other hand, for the system bus 22, the two-port RAM 26 is composed of a buffer area 28E, an external pointer area 32E and an internal pointer area 30E corresponding to the buffer 28, the external pointer 32 and the internal pointer 30, respectively, as shown in FIG. 1.

The buffer area 28E is accessed in read and write modes by the central processors 10, 12, 14 and 16. The external pointer area 32E stores an address data for access to the buffer area 28E, and is accessed in read and write modes by the central processors 10, 12, 14 and 16. When the presently stored address is read by the central processor 10, 12, 14 or 16, the address data is renewed automatically in accordance with the increment data "Lb" for the subsequent access to the buffer area 28E. The internal pointer area 30E can not be accessed by the central processor 10, 12, 14 and 16, while it is accessed only by the I/O panel 18.

Figure 6:
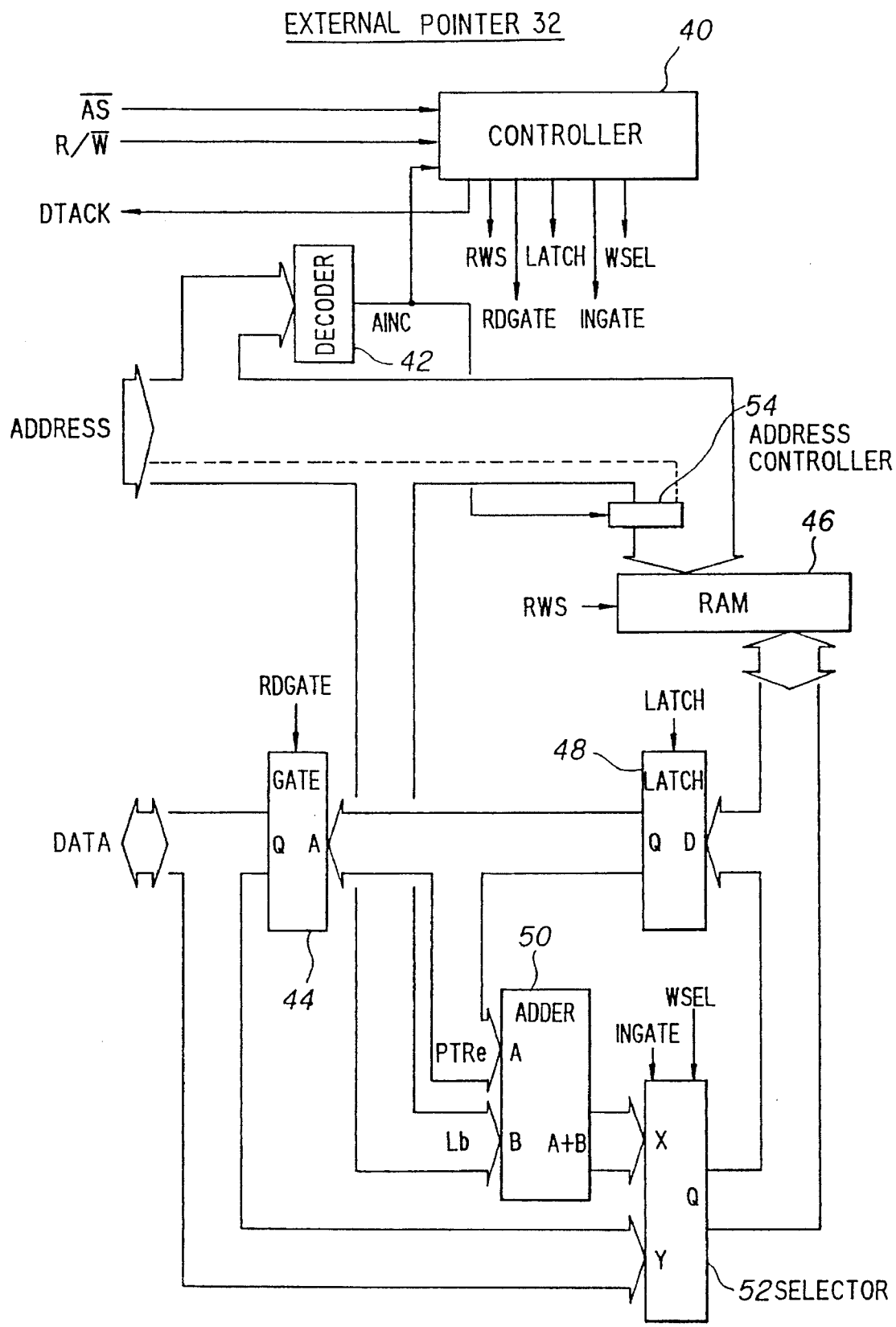
FIG. 6 is a block diagram showing an external pointer used in the preferred embodiment.

FIG. 6 shows the external pointer 32 including a timing controller 40 supplying timing signals RWS, RDGATE, LATCH, INGATE and WSEL, a decoder 42 for decoding an address signal, a gate 44 for controlling the transfer of data, a RAM 46 for storing a predetermined data, a latch circuit 48 connected between the gate 44 and the RAM 46 for latching a signal read from the RAM 46, an adder 50 for adding the read address data A and an increment data B, a selector 52 for selecting an input signal between X and Y to write an output signal Q to the RAM 46, and an address controller 54 for masking the increment data "Lb" of the data 100.

The I/O panel 18 including the external pointer 32 operates in first and second modes. The first mode is carried out as an ordinary operation, when an address signal is decoded in the decoder 42 for access to addresses other than an address assigned to the external pointer 32, and the second mode is carried out as a specified operation to embody the invention, when an address signal is decoded therein for access to the address signal assigned to the external pointer 32.

(a) FIRST MODE

In writing mode, the gate 44 is closed and the input Y of the selector 52 is opened, so that a predetermined data is supplied to the RAM 46 through the selector 52. In reading mode, a data stored in the RAM 46 is supplied to the system bus 22 through the latch circuit 48 and the gate 44.

(b) SECOND MODE

Here, it is assumed that the central processor 10 is selected to access to the external pointer 32 by the bus arbitration circuit 24. An address signal designating the RAM 46 assigned to the external pointer 32 is supplied to an address bus to be connected to the decoder 42. An AINC (auto-increment) signal is generated in the decoder 42 to be supplied to the controller 40 by decoding the address signal excluding lower eight bits assigned to an auto-increment data, so that the gate 44 and the latch circuit 48 become opened. Thus, an address data stored in the RAM 46 is supplied to the central processor 10 through the latch circuit 48 and the gate 44. The increment data "Lb" is supplied to the address bus together with the read address signal. At the same time, the read address data is latched at the latch circuit 48 to be supplied to the input A of the adder 50, so that the address data is added with the increment data "Lb" supplied from the address bus to the input B of the adder 50. The added data is supplied through the selector 52 to the RAM 46, so that the added data is stored therein as a renewal address data. Finally, a signal DTACK indicating a finish of the access is supplied from the controller 40 to the central processors 10. The central processor 10 transfers the data to be written to the buffer 28 by accessing to the address supplied from the external pointer 32.

Figure 7:
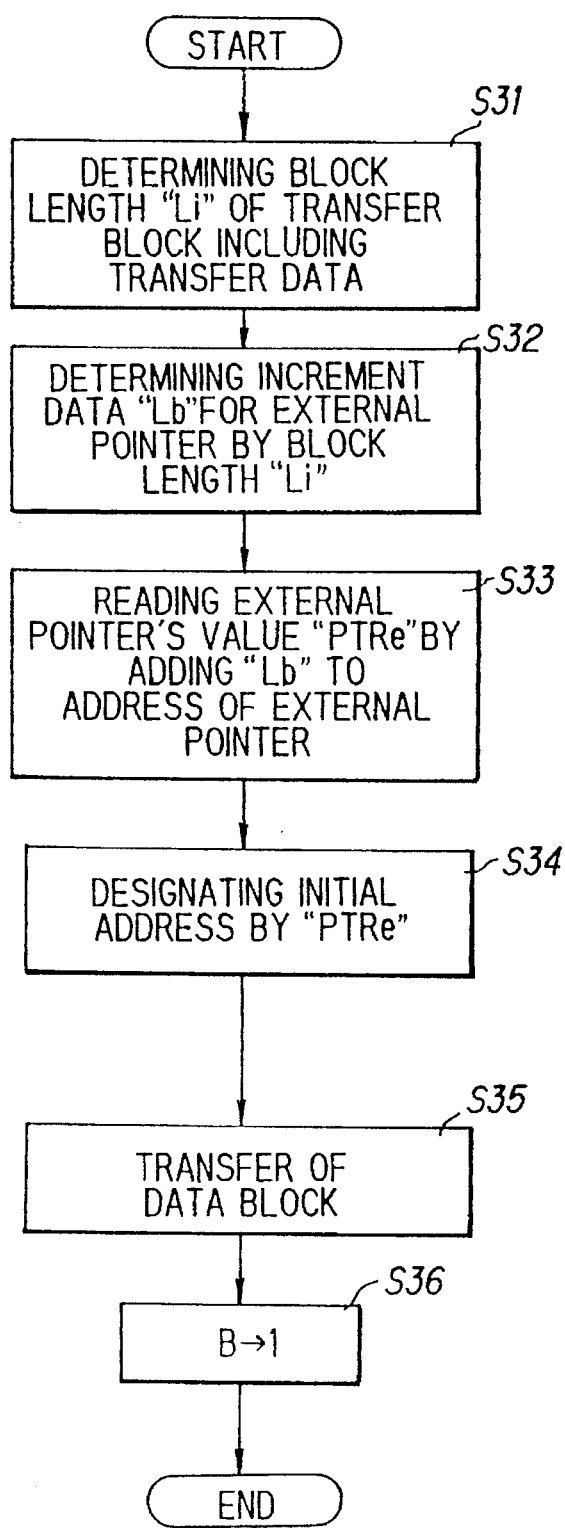
FIGS. 7 and 8 are flow charts showing operation of the preferred embodiment.
Figure 8:
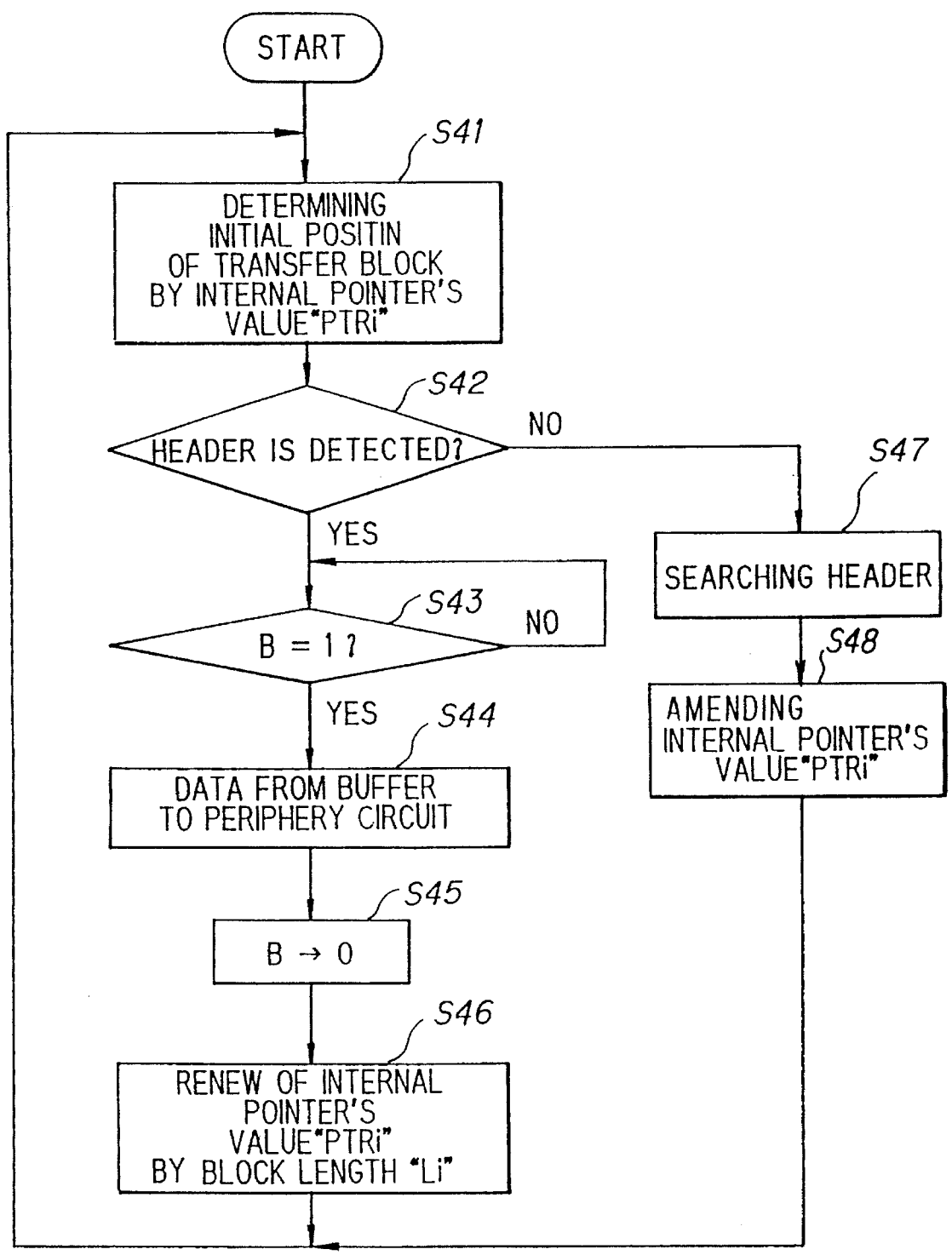
Figure 9:
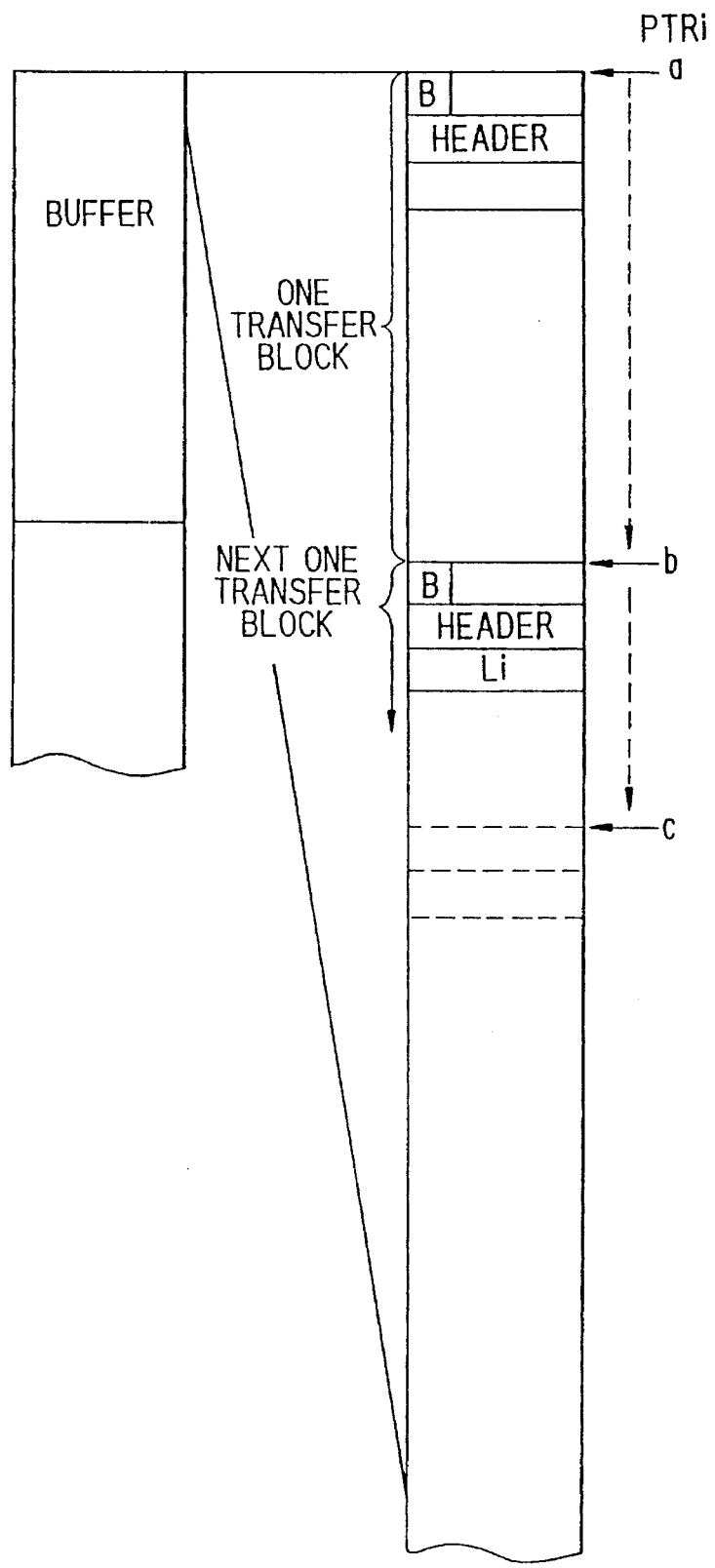
FIG. 9 is a format of a data stored in the buffer.

Next, this described operation will be again explained in conjunction with FIGS. 7 to 9.

In FIG. 7, it is also supposed that the central processor 10 is selected by the bus arbitration circuit 24. When the selected signal is supplied from the bus arbitration circuit 24 to the central processor 10, the central processor 10 supplies a predetermined signal to the external pointer 32. In response to the signal supplied from the central processor 10, an address data PTRe stored in the external pointer 32 is supplied to the central processor 10. At the same time, the central processor 10 detects a block length "Li" of a transferred data block (S31), and an auto-increment data "Lb" is calculated in accordance with the block length "Li" (S32) to produce an address signal 100 including the increment data "Lb" as shown in FIG. 2. For example, if it is supposed that the minimum storing bit length of the external pointer 32 is sixty four bits, the block length "Li" is divided by sixty four. Then, an integer value of the divisional calculation result is added to the value "1" to provide the increment data.

Next, the renewal data 100 is supplied from the central processor 10 to the external pointer 32 through the system bus 22 (S33). The increment data "Lb" is added to the read and latched address data, so that a subsequent address data representing an initial address of a subsequent data transferred from another central processor is stored therein instead of the precedent address data.

After that, an intial address of the data block is determined in accordance with the data of the external pointer 32 (S34), so that the data block is transferred from the central processor to the buffer 28 (S35). When the data transfer is finished, the buffer busy flag "B" becomes "1" (S36).

FIG. 8 shows a flow chart of the preferred embodiment in a case that a predetermined data stored in the buffer 28 is supplied to the line 20 by using the internal pointer 30. When an initial address of a transferred data block is designated in accordance with an address data PTRi stored in the internal pointer 30 (S41), a header "HEADER" is judged to be set or not at a position having a predetermined relation to the detected initial address (S42). When the header "HEADER" is detected as shown in FIG. 9 at "a" and "b", the buffer busy flag "B" is judged to be set to be "1" or not (S43). When the buffer busy flag "B" is set to be "1", the data block is read from the initial address and is transferred to the line 20 (S44). If the buffer busy flag "B" is not set to be "1", the data block is not read until the busy flag becomes "1". When the transfer is finished, the buffer busy flag "B" is reset to be "0" (S45), the precedent address data PTRi of the internal pointer 30 is renewed in accordance with the block length "Li", and back to the step S41.

If the address data PTRi stored in the internal pointer 30 designates a midpoint of the data block, at which a header "HEADER" is not detected as shown in FIG. 9 at "c", a header "HEADER" is searched in the buffer 28 (S47), the wrong address data is amended in accordance with a position of the searched header "HEADER" (S48), and back to the step S41.

As described above, according to the preferred embodiment, the address data PTRe of the external pointer 32 is renewed in accordance with a length of a transferring data block, so that the data block can be transferred at one time. Therefore, operating speed of the system becomes high. Further, there is decreased useless area in each of the buffer areas, so that the buffer 28 can be used efficiently.

In addition, the transferring data block includes a header "HEADER", so that a data block stored in the buffer can be read from its initial point at any time.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. A data transfer system, comprising:

a plurality of processors each having predetermined data blocks to be transferred;

a buffer having a predetermined number of buffer areas for storing data transferred from said plurality of processors;

an external pointer storing an address designating a position of one of said buffer areas in said buffer, a system bus connecting said plurality of processors to said buffer;

means for providing arbitration of said system bus to allow only one of said plurality of processors to access said buffer;

means for retrieving and reading the address stored in the external pointer, the address including a plurality of bits indicating a size of data transferred to said buffer from said one of said plurality of processors;

means for renewing the address stored in the external pointer and read therefrom in accordance with the plurality of bits indicative of the size of data; and means for providing a data storing area of a predetermined length in said buffer in accordance with the size of data;

wherein when any of said plurality of processors accesses the external pointer to write data to said buffer, the address stored in the external pointer is read out and incremented by a digital value corresponding to an indication of the plurality of bits which are included with the address by the renewing means.

2. A data transfer system, according to claim 1, further comprising:

an internal pointer storing an address data designating an initial position of said buffer areas storing said data block transferred from said processors, wherein said data block has a header representing said initial position of said data block; and said header is searched when said data block stored in said buffer is read; and said stored data block is read from said header in accordance with said address data stored in said internal pointer.

3. A data transfer system, according to claim 2, wherein:

said address data is corrected to be an address data representing a position of said searched header, if said header is not set at a predetermined position.

4. A data transferring system, according to claim 1, wherein the incremented address is determined by adding a first digital value corresponding to the address stored in the external pointer to the digital value corresponding to the plurality of bits which are included with the address.

5. A data transferring system, according to claim 4, wherein the data storing area of a predetermined size in said buffer corresponds to said one of said buffer areas that is pointed to by the address stored in the external pointer.

6. A data transferring system, according to claim 1, wherein said buffer is housed in an I/O panel.

7. A data transferring system, according to claim 1, wherein said including means provides a start address for writing said data to said buffer by said any of said plurality of processors.

8. A data transferring system, according to claim 1, wherein said including means includes said plurality of bits corresponding to a size of data to be transferred with lower order bits of said address stored in the external pointer.

9. A data transferring system, according to claim 1, wherein said renewing means renews the address stored in the external pointer during an address read cycle of said any of said plurality of processors.

10. A data transferring system, according to claim 1, wherein said any of said plurality of processors is prevented from accessing said buffer until the address stored in the external pointer is renewed by renewing means.

11. A data transferring method, according to claim 9, wherein the new address is computed in the step e) by adding a first digital value corresponding to the auto-increment value to a second digital value corresponding to the address stored in said external pointer.

12. A data transfer system, comprising:

a plurality of central processors each controlling a transfer of a data block;

a buffer memory for storing data blocks transferred through a system bus from said plurality of central processors;

a bus arbitration circuit for arbitrating a use of said system bus by one of said plurality of central processors; and a pointer for storing a buffer address designating an initial address of said buffer memory in said transfer of said data block;

wherein said one of said plurality of central processors accesses said pointer to read said buffer address by using an address signal including a pointer address for designating said pointer and an increment data proportional to a block length of said data block;

wherein said pointer updates said buffer address stored therein by adding said increment data to said buffer address to generate a renewing buffer address, said renewing buffer address being stored in place of said buffer address; and wherein said one of said plurality of central processors transfers said data block to said buffer memory by using said buffer address read from said pointer.

13. A data transfer system, according to claim 12, wherein:

said pointer is included in an I/O panel, said I/O panel including a further pointer for storing an additional address signal designating an additional initial address of said buffer memory, a data block being read from said additional initial address of said buffer memory to be transferred to a periphery circuit.

14. A data transfer system, according to claim 13, wherein:

said pointer is accessed by said plurality of central processors, while said further pointer is accessed by said I/O panel.

15. A method for transferring data from one of a plurality of processors to a buffer, said buffer including a plurality of buffer areas designated by buffer addresses and an external pointer storing one of said buffer addresses that is used to point to one of said plurality of buffer areas, said method comprising the steps of:

a) determining a block length of a block of data to be transferred to said buffer from said one of said plurality of processors;

b) supplying a predetermined signal from said one of said plurality of processors to the external pointer in preparation for transfer of said block of data to said buffer, said predetermined signal including an external pointer address for designating said external pointer and an auto-increment value determined by said block length;

c) supplying said one of said buffer addresses from the external pointer to said one of said plurality of processors in response to said predetermined signal, said one of said buffer addresses being indicative of one of said buffer areas in which said block of data is to be stored within said buffer;

d) renewing the external pointer with another of said buffer addresses for a next data transfer to said buffer by any of said plurality of processors by adding said auto-increment value to said one of said buffer addresses; and e) writing the block of data to said buffer at said one of said buffer addresses.

* * * * *